July 15, 1969  G. HOHWART  3,455,567
AUTOMATED GEAR CHUCK
Filed March 31, 1966  2 Sheets-Sheet 1
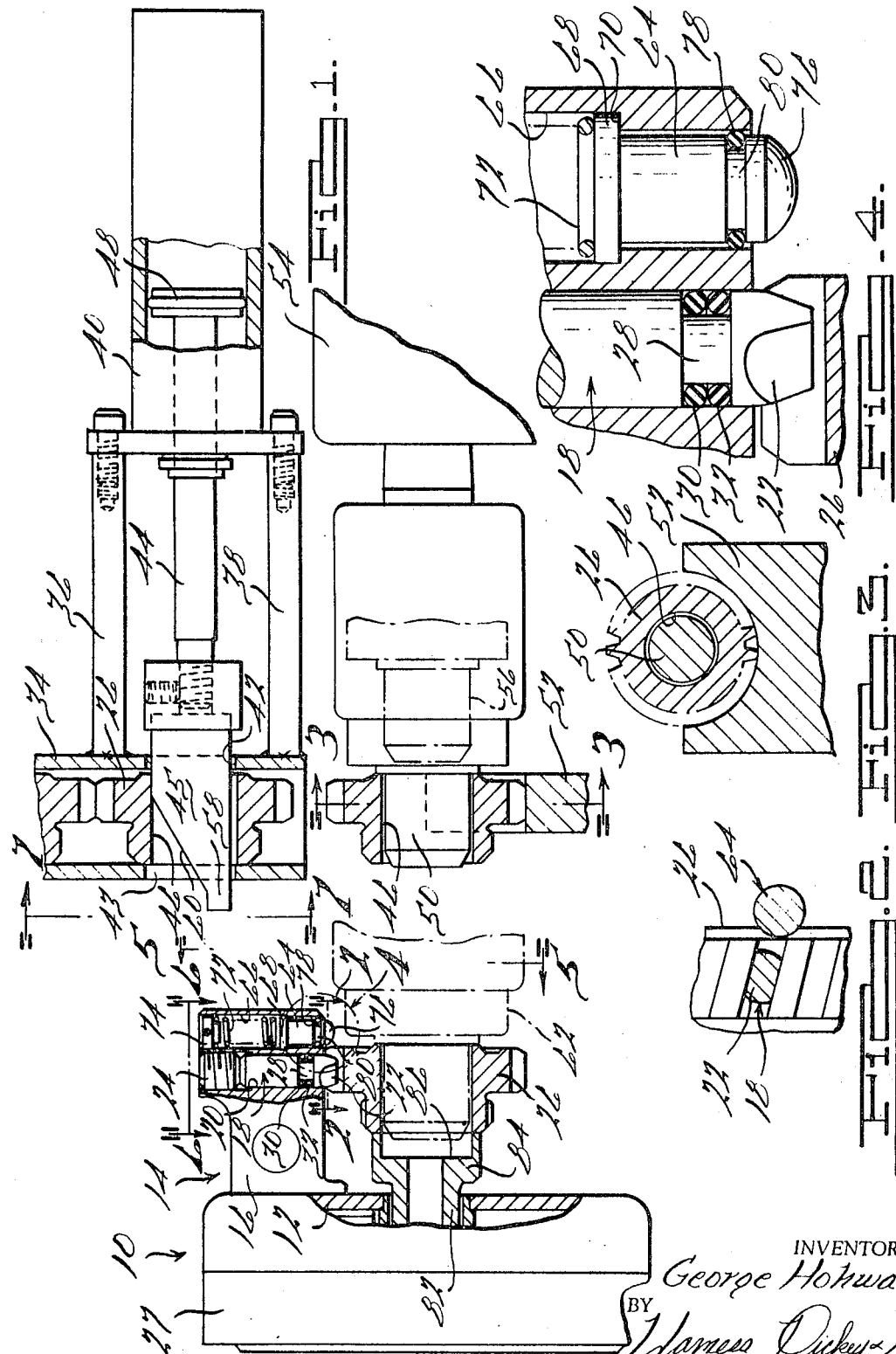
INVENTOR.
George Hohwart
BY
James, Dickey & Pierce
ATTORNEYS

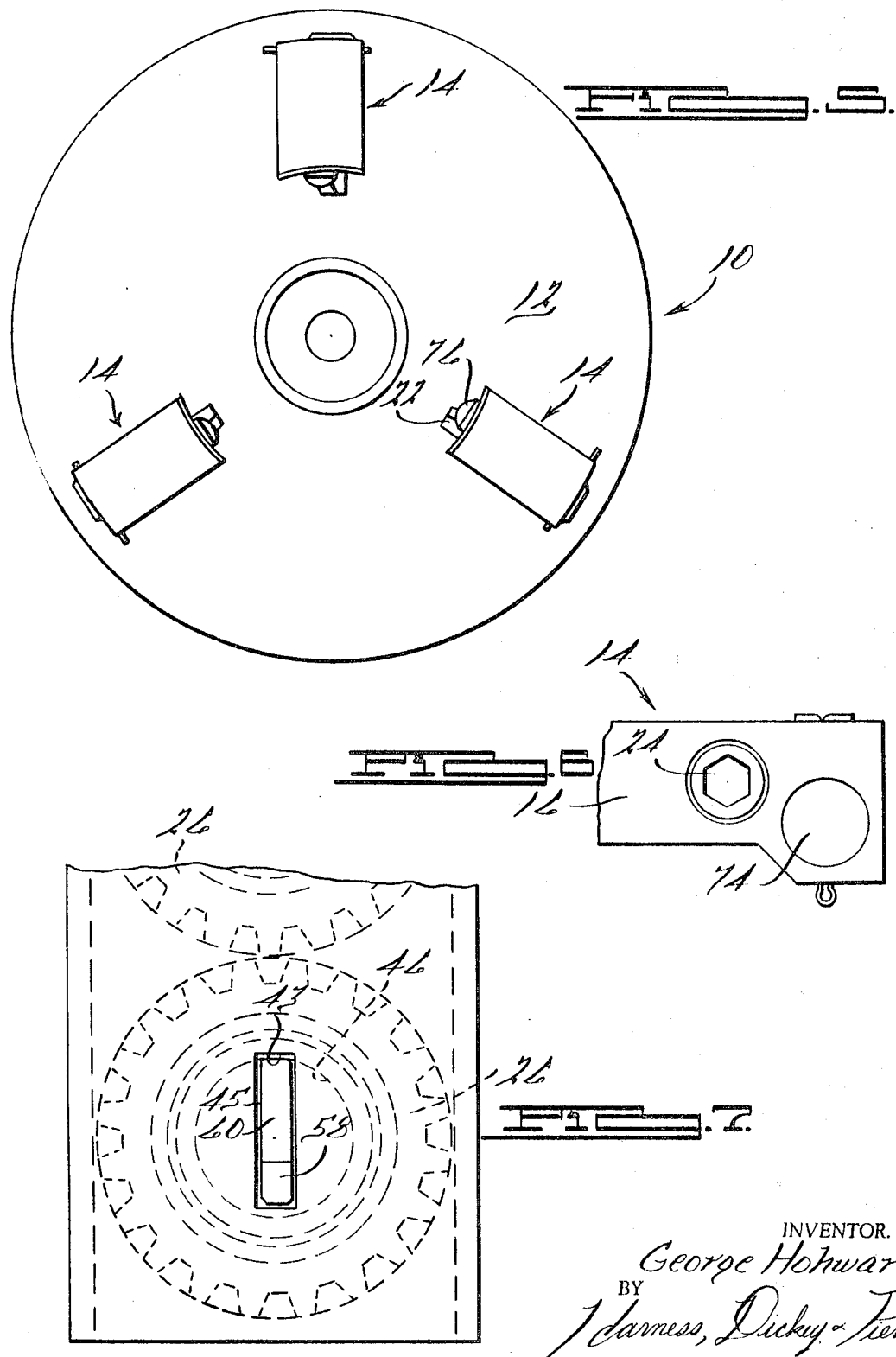

United States Patent Office 3,455,567
Patented July 15, 1969

3,455,567
AUTOMATED GEAR CHUCK
George Hohwart, Farmington, Mich., assignor to N. A. Woodworth Company, Ferndale, Mich., a corporation of Michigan
Filed Mar. 31, 1966, Ser. No. 539,077
Int. Cl. B23f 23/06; B23b 31/16
U.S. Cl. 279—110                                    8 Claims

ABSTRACT OF THE DISCLOSURE

A chuck for gear blanks and the like wherein the work clamping and holding jaws have work engaging elements and are provided axially outwardly of these elements with round-nosed, spring-loaded pins which engage a workpiece being loaded into the chuck and start it rotating before it engages the work clamping elements, whereby the chuck can be loaded while it is still rotating without significant clash or interference between the workpiece and the clamping elements.

---

This invention relates to new and useful improvements in work holding chucks.

Workpieces such as gears or other toothed or splined elements conventionally are clamped in power operated, rotatably driven chucks for grinding and machining operations or for other purposes. The chuck is carried by a rotatably driven spindle in the machine, and the workpiece is held at spaced points around the periphery thereof by suitably shaped clamping pins in the chuck jaws. In the case of gear blanks, for example, the work clamping pins fit in the interdental spaces between adjacent gear teeth. They clamp against the flanks of the teeth and preferably on the pitch circle of the gear so that the workpiece is positioned concentrically with the rotational axis of the chuck. However, because of the interfitting relationship between the clamping pins and the teeth of the workpiece, it has heretofore been necessary and the usual practice after each operation on the work, to first stop the machine and then to open the chuck and remove the workpiece. Another workpiece is then inserted in the chuck; the chuck is closed to engage the clamping pins with the workpiece and the machine is then again started in operation to rotatably drive the chuck and the work for the next operation on the latter. The necessity of performing all of these operations sequentially, and particularly the need to stop the machine each time an operation on the work is finished and a new workpiece is inserted into the chuck, considerably increases the time and consequently the cost of processing each workpiece.

From the foregoing, it will be readily apparent that there is a need in the art for a means of loading and unloading gear blanks and similar workpieces in power driven, work holding, industrial chucks of the type referred to above while the latter is continuously rotatably driven.

An important object of the present invention is to provide a simple and relatively inexpensive means for adapting industrial chucks for automated loading and unloading of gear blanks and similar workpieces while the chuck is continuously rotatably driven.

Another object of the invention is to provide means of the above mentioned character that perform the loading and unloading operation with a minimum of clashing between the workpiece and the chuck so that the operation of loading and unloading the latter can be performed with a minimum of damage and wear to the chuck and especially to the precision gear clamping pins used in the chuck.

Other objects and advantages of the invention will be apparent during the course of the following description.

In the drawings, forming a part of this specification and wherein like numerals are employed to designate like parts throughout the same:

FIGURE 1 is a side view showing parts in section and parts in elevation of a typical industrial diaphragm chuck equipped with automatic work loading and unloading devices and mechanisms embodying the present invention;

FIGURE 2 is an enlarged, fragmentary, horizontal sectional view taken on the line 2—2 of FIGURE 1;

FIGURE 3 is a vertical sectional view taken on the line 3—3 of FIGURE 1;

FIGURE 4 is an enlarged view of the portion of FIGURE 1 enclosed in the circle 4;

FIGURE 5 is a face view of the chuck shown in FIGURE 1 looking in the direction of the arrows 5—5;

FIGURE 6 is a fragmentary plan view looking in the direction of the arrows 6—6 of FIGURE 1; and FIGURE 7 is a view looking in the direction of the arrows 7—7 in FIGURE 1 showing a fragmentary portion of the loading chute for delivering workpieces to the chuck.

As suggested, the apparatus of this invention is capable of use with different types and kinds of chucks; however, for purpose of illustration it is here shown mounted on and associated with a diaphragm chuck 10 of the type disclosed in the Hohwart et al., Patent No. 2,462,501 which issued Feb. 22, 1949. This chuck has a flexible resilient metal diaphragm 12 that carries a plurality of concentrically disposed axially outwardly extending jaw assemblies 14. Three such jaw assemblies 14 are here shown (FIGURE 5).

Each jaw assembly 14 comprises a jaw base 16 which is brazed or otherwise fixedly attached to the diaphragm 12 and a work clamping element or pin 18 carried by the base. As best shown in FIGURE 1, the jaw base 16 of each jaw assembly is provided adjacent the outer end thereof with a transverse bore 20 which extends radially of the chuck 10, and the work clamping pin 18 of the assembly is disposed in the bore with the inner end 22 thereof projecting from the base for engagement with a workpiece. A set screw 24 in the internally threaded outer end portion of the bore 20 butts against the pin 18 to keep the latter from moving radially outwardly in the base, and it is adjustable in the hole to position the pin 18 axially for proper engagement with the work. The pin 18 is adapted to clamp a workpiece 26 which is here shown in the form of a gear, and the projecting inner end of the pin has a rack-tooth form which fits into one of the interdental spaces between adjacent teeth of the workpiece and preferably seats on the flanks of the teeth at substantially the pitch circle or pitch cylinder thereof. Manifestly, it is desirable that the workpiece 26 be clamped and held precisely in coaxial relation with the chuck 10 and the set screws 24 collectively permit the necessary adjustments to be made to assure such alignment. In the particular form of the invention here shown, the pin 18 is necked down or reduced in diameter at 28 adjacent the inner end of the bore 20. O-rings 30 and 32 surrounding the reduced portion 28 are confined and compressed against the wall of the bore 20 to seal the inner end of the latter and, by frictional resistance to turning of the pin, to hold the latter in a selected angular or rotational position with the inner end thereof disposed for proper meshed engagement with the workpiece 26.

Any suitable or conventional means may be employed to flex the diaphragm 12 to open and close the chuck jaws 14. The usual practice is to incorporate a power actuator in the form of a piston and cylinder in the rear portion of the chuck body 27 which carries the diaphragm 12, as shown in the Hohwart patent previously referred to, and it is contemplated that this form of actuator may be used in the chuck here shown. However, inasmuch as the specific form of actuator is not a part of the present invention, the details of its construction are not here shown. Suffice it to say that to the extent this mechanism may be necessary to an understanding of the construction and operation of the chuck 10, the disclosure of the above patent is incorporated by reference herein. Also, it will be understood that the chuck 10 here shown is adapted for mounting on the spindle of a machine (not shown) in any suitable or conventional manner, as for example, in the manner shown in the Hohwart patent hereinabove referred to.

In operation of the chuck 10, the diaphragm 12 is flexed axially outwardly or to the right as viewed in FIGURE 1, to open the jaws 14 so that a workpiece 26 can be inserted into or ejected from the chuck; and, when the diaphragm is released, it flexes back by its own inherent resilient action to engage the jaw pins 18 with the workpiece which thus clamp the latter solidly in the chuck. The spindle on which the chuck is mounted is of course mounted for rotation and is power driven to rotatably drive the chuck and the workpiece 26 clamped thereon for a machining or other operation.

In the particular form of the invention here shown, workpieces 26 are supplied to the chuck 10 from any suitable source by a loading chute 34 which supports a single column of workpieces as shown in FIGURE 1. On the lower end of the chute 34 and extending laterally therefrom are supports 36 and 38 which carry a power cylinder 40 disposed horizontally opposite aligned opening 42 and 43 in the chute. The piston rod 44 of the power cylinder 40 extends inwardly toward the chute 34 and a plunger 45 on and connected to the end of the piston rod projects through the openings 42 and 43 in the chute 34 and through the central shaft opening 46 of the lowermost workpiece 26 when the piston 48 is in the advanced position shown in the drawing.

Aligned horizontally with the chuck 10 is a freely rotatable and reciprocable arbor 50 which picks up workpieces from a part rest 52 disposed below the arbor and in vertical alignment with the loading chute 34 for delivery to the chuck 10. The loading arbor 50 can be rotatably and reciprocably mounted in any suitable or conventional manner but is here shown as part of a conventional machine tail stock 54. When the arbor 50 is retracted to the broken line position shown at 56 in FIGURE 1, it clears the part rest 52 so that, when the piston 48 is retracted to withdraw the plunger 45 from the lower most workpiece 26 in the chute 34, the entire column of workpieces drops down and deposits the lowermost workpiece on the part rest 52. This operation leaves the workpiece 26 which is second from the bottom in the column substantially entirely within the chute 34 with a major portion of its central opening 46 in register with the chute openings 42 and 43. Thus, when the piston 48 is again advanced, the terminal portion of the plunger 45 enters the central opening 46 of the workpiece referred to above and the beveled top surface 60 of the plunger cams the workpiece upwardly to lift it and the entire column of workpieces back into the chute and leaving the lowermost workpiece alone on the part rest 52 as shown in FIGURE 1. The arbor 50 is then advanced from the broken line position 56 and as it moves to the full line position it enters the central opening 46 of the workpiece 26 on the rest 52. As the arbor 50 continues to advance it moves the workpiece 26 off of the rest 52 and into the chuck 10 as shown by the broken line position at 62 in FIGURE 1.

As suggested heretofore the problem is how to mesh the teeth of the workpiece 26 with the work engaging and clamping pins 18 of the chuck jaw assemblies 14 while the chuck is being rotatably driven without damaging either the workpiece or the pins. This problem is solved according to the present invention by providing a reciprocable, spring loaded, bullet-nosed clutch pin 64 on each jaw assembly 14 axially outwardly of and in alignment with the work clamping pin 18. To adapt the jaw base 16 for this purpose, it is simply extended outwardly sufficiently beyond the pin element 18 to accommodate the clutch pin 64, the latter being mounted for reciprocable sliding movement in a bore 66 provided in the jaw base outwardly of the bore 20. A radial flange 68 at the inner end of the clutch pin 64 seats against an annular shoulder 70 provided in the bore 66, and a helical spring 72 confined in the bore between the pin 64 and a closure plug 74 holds the pin normally fully advanced with the spherical inner end 76 thereof projecting from the jaw base and into the path of travel of the workpiece 26. An O-ring 78 disposed in an annular groove 80 provided in the clutch pin 64 adjacent the inner end thereof is compressed lightly against the wall of the bore 66 to seal the inner end thereof.

The collective clutch pins 64 are positioned so that only the spherical inner ends thereof contact the teeth of the workpiece 26 as the latter is pushed into the chuck, and the diameters of the pins are greater than the interdental spaces between the gear teeth, as shown in FIGURE 2, so that the pins do not extend between or mesh with the teeth. Also, the clutch pins 64 are aligned axially with the work engaging pin elements 18 according to the type of workpiece to be chucked. For example, if the workpiece is a spur gear, the clutch pins 64 are disposed directly in front of their respective work engaging pin elements 18. On the other hand, if the workpiece is a helical gear, as shown in FIGURE 2 for example, the clutch pins 64 are laterally offset relative to their respective work clamping pin elements 18 at the same helix angle as the gear teeth.

From the foregoing it will be readily apparent that when a workpiece 26 is inserted into the chuck 10 by the arbor 50, it engages the clutch pins 64 before coming into contact with the pin elements 18. However, inasmuch as the clutch pins 64 slide easily in the bores 66, they ratchet freely over the gear teeth of the workpiece 26. At the same time the clutch pins 64 are held in yieldable pressed engagement with the gear teeth by the springs 72. As a result, the clutch pins 64 start the workpiece 26 spinning or rotating on the arbor 50, and by the time the workpiece moves into contact with the clamping pin elements 18 it is rotating substantially at the same speed as the chuck 10. Thus, the workpiece 26 moves easily into meshed engagement with the clamping pin elements 18 with a minimum of clash and interference.

The chuck 10 is here shown equipped with a work ejector 82 which extends centrally through the chuck and usually also through the spindle on which the chuck is mounted. The particular work ejector, per se, is conventional and a detailed description of it therefore is unnecessary. Suffice it to say that the ejector 82 rotates with the spindle and with the chuck 10 but is mounted for reciprocation relative thereto. Further, it is reciprocably actuated in any suitable or conventional manner as by a hydraulic cylinder, an air cylinder or a spring. The forward end of the ejector 82 projects from the chuck 10, and the particular ejector here shown is provided with an enlarged annular head portion 84 which seats the adjacent end of the workpiece 26 and thus locates the latter axially in the chuck. Desirably, a central recess 86 is provided in the head 84 to accommodate any portion of the arbor 50 that extends through and beyond the workpiece 26.

In operation, the ejector 82 comes back preferably against a fixed stop (not shown) to locate the workpiece 26 axially in the chuck 10 and as suggested it provides a back stop for the workpiece during the machining or other operation on the work. Then, when the chuck 10 is opened to release the workpiece 26, the ejector 82 advances to push the workpiece out of the chuck. At this time the arbor 50 is fully retracted to the position shown at 56 and the ejected workpiece is collected by or carried away from the machine in any suitable or conventional manner. After the workpiece has been ejected, the ejector 82 remains in the extreme forward position and ahead of the clutch pins 64 until it is engaged by the next workpiece 26 delivered to the chuck by the arbor 50. Since the ejector 82 rotates with the chuck 10 it starts the workpiece 26 rotating on the arbor 50 immediately upon contact and its retracts as the arbor advances so as to maintain continuous frictional engagement with and rotation of the work. If the pressure exerted by the ejector 82 on the work 26 is light enough and the advance of the loading arbor 50 is fast enough the workpiece 26 will be rotating only at a slightly lesser speed than the chuck 10 when the gear teeth of the work contacts the clutch pins 64. This is desirable as it assures proper indexing of the gear teeth with respect to the clamping pins 18 when the work is advanced into engagement with the pins. Thus, the ejector 82 starts the workpiece 26 to rotating on the arbor 50 and brings it up to a rotational speed approximating that of the chuck 10 before the work engages the clutch pins 64 so that the impact of the workpiece on the clutch pins is relatively less than otherwise would be the case. This permits the clutch pins 64 to accelerate the rotational speed of the workpiece 26 essentially quickly so that it is rotating substantially in unison with the chuck at the time it is presented to the clamping pins 18 and accordingly positions the teeth of the workpiece properly for engagement by the clamping pin elements 18. Thus, the workpiece 26 moves smoothly into meshed engagement with the clamping pins 18 with a minimum of interference and noise.

The control mechanism including the hydraulic or electrical circuitry necessary for properly coordinating the opeation of the chuck 10, the power cylinder 40, the arbor 50 and the ejector 82 is not shown, but it will be apparent that it is conventional and can be readily devised by mechanics skilled in this particular art. In the preferred sequence of operation, the chuck 10 is opened and the power cylinder actuation of the plunger 45 is retracted to permit the lowermost workpiece 26 in the loading chute 34 to fall onto the part rest 52. The plunger 45 is then advanced to lift the column of workpieces 26 remaining in the loading chute 34 away from the workpiece on the part rest. The arbor 50 is then advanced to pick up the workpiece 26 on the part rest 52 and to move it into the chuck 10. As the workpiece 26 moves into the chuck 10 it first engages the ejector 82 which is in the advanced position following the previous work ejecting operation. The ejector 82 immediately starts the workpiece 26 to rotating on the arbor 50 and thus smooths the operation as the workpiece moves progressively into engagement with the clutch pins 64 and work clamping pins 18. When the arbor 50 is fully advanced and the workpiece 26 is fully inserted into the chuck 10, the latter is closed and the arbor 50 is retracted. The machining or other operation is then performed on the workpiece 26 and thereafter the chuck 10 is opened and the ejector 82 is advanced to push the workpiece out of the chuck. This completes the cycle of operation and prepares the apparatus for the next cycle.

Having thus described the invention, I claim:

1. In a rotatably driven chuck for workpieces having teeth and interdental spaces between said teeth, said chuck being of the type wherein workpieces are fed axially to the chuck for engagement by a plurality of jaw assemblies having work clamping elements adapted to extend radially into the interdental spaces of the workpiece and to move into and out of clamping engagement with the workpiece, the improvement comprising means on said chuck for facilitating loading of workpieces onto said chuck while the latter is rotatably driven including at least one clutch device, each clutch device including a radially yieldable round-nosed member also adapted to fit between adjacent teeth of a workpiece and disposed axially in front of said work clamping elements and in predetermined angular relation thereto so that a workpiece fully engaged thereby and rotating in unison therewith is positioned to mesh smoothly with said work clamping elements, the nose portion of said clutch member being adapted to engage with yielding pressure the teeth of a rotatably supported workpiece as the latter is inserted into the chuck while the chuck is being rotatably driven and before the workpiece is moved into position for clamping engagement by said work clamping elements and being operable by such engagement to start the workpiece rotating prior to engagement of the workpiece with said work clamping elements so as to synchronize rotation of said workpiece with said work clamping elements before the workpiece moves axially into clamping position with respect to said work clamping elements, whereby to preclude interference and clash between the teeth of said workpiece and said work clamping elements as the workpiece is moved into position to be clamped.

2. The combination as set forth in claim 1 including a plurality of said clutch devices, wherein said clutch devices are mounted in radially extending holes in said jaw assemblies and disposed axially outwardly of said work clamping elements, and wherein the round-nosed members of said clutch devices are mounted for reciprocation in said holes, said clutch devices also including spring means in said holes behind and acting on said round-nosed members for holding the latter in pressed yielding engagement with said workpiece.

3. The combination as set forth in claim 2, wherein said work clamping elements and said clutch devices are disposed concentrically around the rotational axis of the chuck and are spaced circumferentially generally equidistantly with respect to each other for engagement with the teeth of a gear shaped workpiece, and wherein the diameters of said round-nosed members are greater than the interdental spaces between the teeth of the workpiece to be engaged thereby.

4. Apparatus including the rotatably driven chuck as set forth in claim 2 and an automatic work loading device in front of said chuck, for feeding workpieces to the chuck, said work loading device having a reciprocable arbor movable along the rotational axis of the chuck and operative during reciprocable movement thereof toward the chuck to pick up a workpiece and to move it into engagement first with the round-nosed members of said clutch devices and then with said work clamping elements.

5. The combination as set forth in claim 2, including a workpiece ejector mechanism disposed in the chuck behind said work clamping elements, said workpiece ejector mechanism including means reciprocably movable along the axis of the chuck and operable by outward axial movement thereof to eject a workpiece from said chuck, said means being further operable in the course of said ejection operation to disengage the workpiece first from said work clamping elements and then from said clutch devices.

6. The combination as set forth in claim 5 wherein said work ejector means is operable in the inner axial position thereof to provide an axial stop for workpieces disposed in the chuck and engaged by said work clamping elements.

7. The combination ase set forth in claim 4 including a work ejector mounted for reciprocation along the axis of the chuck, said work ejector being retractable to a position axially behind said work clamping elements and movable axially outwardly to a position beyond said clutch devices and operable in the fully advanced position to engage a workpiece being delivered by said work loading device to start said workpiece rotating prior to engagement thereof by said clutch devices, said work ejector being retractable as the arbor advances to engage the already rotatably driven workpieces progressively with said clutch devices and said work clamping elements.

8. The combination as set forth in claim 7 wherein said work ejector in the fully retracted position forms a stop for limiting axial movement of the workpiece into the chuck, wherein said work ejector is operable by outward axial movement thereof to move a workpiece progressively and successively out of engagement with said work clamping elements and said clutch devices, and wherein said work ejector is adapted to remain in the advanced position pending delivery of another workpiece by said work loading device.

References Cited

UNITED STATES PATENTS 3,198,533   8/1965   Goodrum _____ 279—123 X

ROBERT C. RIORDON, Primary Examiner

DAVID R. MELTON, Assistant Examiner

U.S. Cl. X.R.

77—5; 279—123